Jan. 5, 1971  D. M. VAN VOORHIS  3,552,225
INTERNAL WORM AND SPEED REDUCER USING AN INTERNAL WORM
Filed Oct. 24, 1968  2 Sheets-Sheet 1

INVENTOR.
DONALD M. VAN VOORHIS
BY Thomson & Schorn

INVENTOR
DONALD M. VAN VOORHIS

BY Thomson & Schorn

ATTORNEY

United States Patent Office 3,552,225
Patented Jan. 5, 1971

3,552,225
INTERNAL WORM AND SPEED REDUCER USING AN INTERNAL WORM
Donald M. Van Voorhis, 54 Heatherhurst Drive, Pittsford, N.Y. 14534
Filed Oct. 24, 1968, Ser. No. 770,272
Int. Cl. F16h 1/16, 1/18, 1/20
U.S. Cl. 74—425     7 Claims

ABSTRACT OF THE DISCLOSURE

An internal worm for use in gears, and a speed reducer using the internal worm and having only four moving parts.

BACKGROUND OF INVENTION

Field of the invention

This invention relates generally to gears, and in particular to an internal worm and to a speed reducer using the internal worm.

Discussion of the prior art

Applicant is not aware of any prior art in the field of gears relating to the internal worm of the present invention. Regarding the speed reducer of the present invention which uses an internal worm, a wide variety of speed reducers are known. A speed reducer of the type which uses spur gears, for example, would require about 50 odd spur gears to obtain the speed reduction obtained by the four-part speed reducer of the present invention. Another type of speed reducer employs a worm turning a worm gear (or worm wheel), however, several worm-worm gear stages would be required to obtain the speed reduction obtained by the present invention and still be of a practical size and design. Further, the worm-worm gear speed reducer has the disadvantage that the output shaft is at 90° to the input shaft. This disadvantage leads to the further disadvantage that every time the speed reduction is varied by changing the number of stages, the direction of the output shaft also varies.

SUMMARY OF THE PRESENT INVENTION

The present invention is in an internal worm and in a small, compact, simple and quiet speed reducer using the internal worm and having only four moving parts. The speed reducer of the preferred embodiment includes a high speed input worm (No. 1 gear), a first ring gear (No. 2 gear in the speed reducer) driven by the input worm, a second ring gear (No. 3 gear) driven by the first ring gear, and a large internal ring gear (No. 4 gear), driven by the second ring gear and connected to the power output shaft.

The first ring gear (No. 2 gear in the speed reducer) has gear teeth on both its inside diameter surface and on its outside diameter surface; this construction is hereby defined as a "two-stage" ring gear. This two-stage ring gear (No. 2 gear) is provided with the *internal worm* of the present invention on its inside diameter surface. The internal worm is in meshing engagement with gear teeth on the outside diameter surface of the second ring gear (No. 3 gear). The two ring gears (No. 2 and 3 gears) are interlocked and are perpendicular to each other. The term "interlocked," as used in this specification, is defined as follows: two ring gears are "interlocked" when each one extends through the opening in the other one, in the manner of the links or rings of a chain. The input worm (No. 1 gear) is in driving engagement with the gear teeth on the outside diameter surface of the two-stage ring gear (No. 2 gear). The second ring gear (No. 3 gear) is inside of and coplanar with the large internal ring gear (No. 4 gear), so that a large number of teeth are in mesh therebetween.

BRIEF DESCRIPTION OF THE DRAWINGS

The present invention will be fully understood by reference to the following detailed description thereof, when read in conjunction with the attached drawings, wherein like reference numerals refer to like elements and in which.

DETAILED DESCRIPTION OF THE PREFERRED EMBODIMENTS

Figure 1:
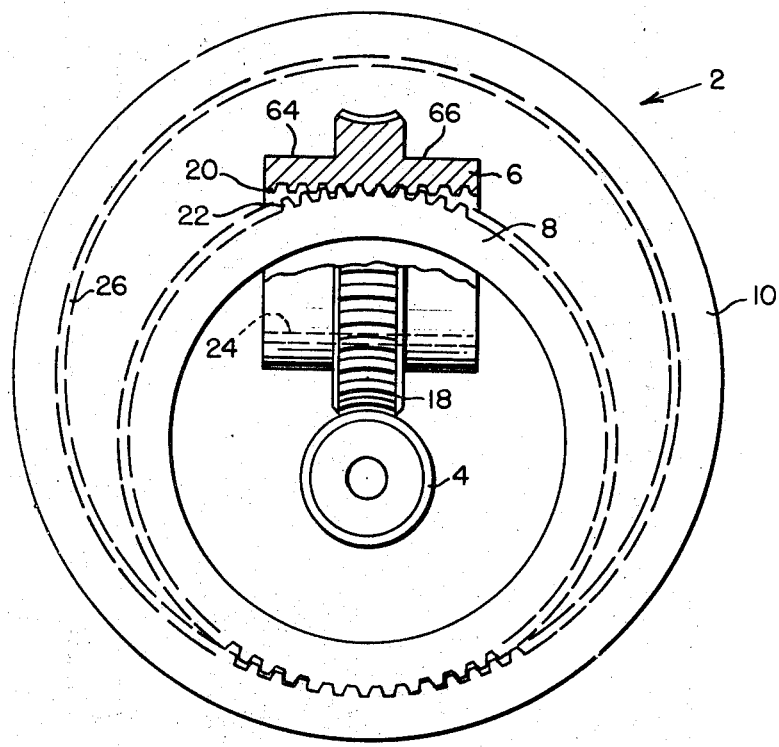
FIG. 1 is a partly cross-sectional, front view of the four-part speed reducer of the present invention.
Figure 2:
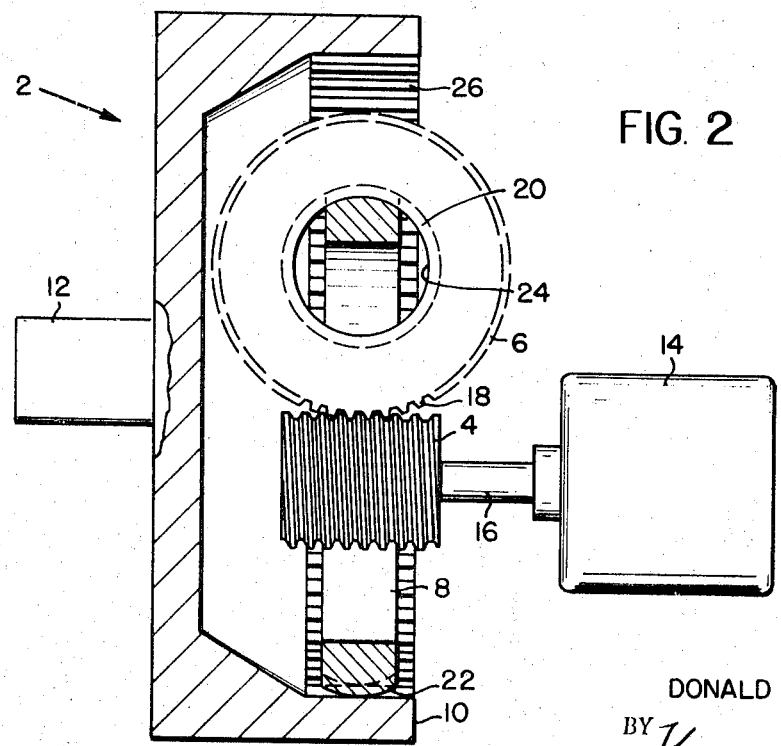
FIG. 2 is a partly cross-sectional, side view of the speed reducer of FIG. 1.

The present invention will now be described in detail with particular reference to the attached drawings. The speed reducer of FIGS. 1 and 2 differs from that of FIGS. 3 and 4, only in the nature of the power output gear. In FIGS. 1 and 2 it is a large internal ring gear; in FIGS. 3 and 4 it is a spur gear. The speed reducer of FIGS. 1 and 2 uses the same support means as does that of FIGS. 3 and 4, however, such support means have been omitted from FIGS. 1 and 2 in order that the gears and their interconnections may be more clearly shown and therefore more easily understood.

The speed reducer 2, shown in FIGS. 1 and 2, comprises an input worm 4, a pair of interlocked ring gears 6 and 8, and a large internal ring gear 10, which is connected to a power output shaft 12. The speed reducer 2 is shown connected to a drive motor 14, through drive shaft 16, to convert, for example, a high speed, low torque rotation of drive shaft 16 to a low speed, high torque, rotation of shaft 12.

The high speed input worm drives the two-stage ring gear 6, which has a worm gear 18 on its outside diameter and an internal worm 20 on its internal diameter. The input worm is in mesh with the worm gear 18. The ring gear 6 drives the one-stage ring gear 8, which has a worm gear 22 on its outside diameter. The internal worm 20 is in mesh with the worm gear 22.

The ring gear 8 extends through the opening 24 in the ring gear 6, and the two-ring gears are positioned perpendicularly to each other. The ring gear 8 is made in two sections, in order to assemble it in interlocking relationship with ring gear 6. After assembly, the two sections can be welded or otherwise connected back together. Alternatively, ring gear 6 can be made in two parts for assembly purposes.

The worm gear 22 of ring gear 8 is in mesh with gear teeth 26 on the inside of the large, internal ring gear 10. There are a large number of teeth in mesh between gears 8 and 10, which is effective in transmitting the high torque developed in the speed reducer.

Figure 3:
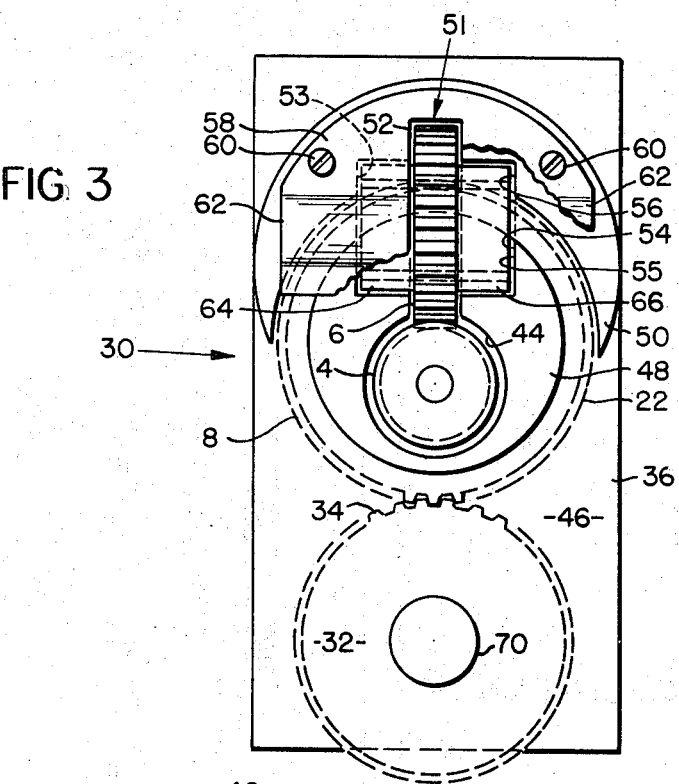
FIG. 3 is a front view, similar to FIG. 1, but also showing support means for the various gears, and showing a spur gear in place of the large internal ring gear of FIGS. 1 and 2.
Figure 4:
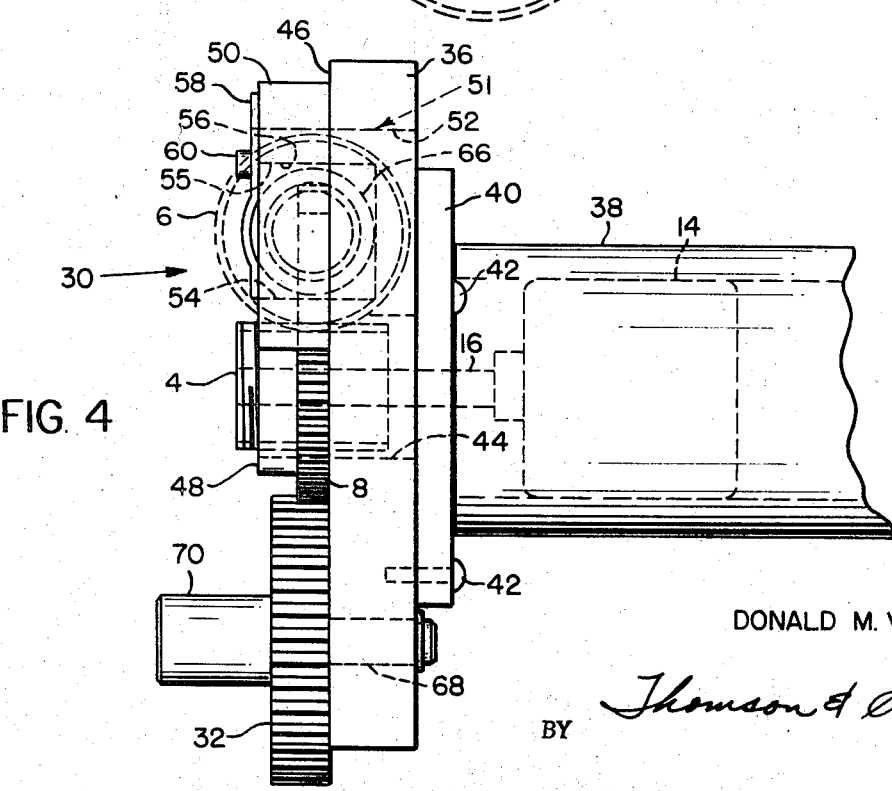
FIG. 4 is a side view of the speed reducer of FIG. 3.

The speed reducer 30, shown in FIGS. 3 and 4, is similar to that described with respect to FIGS. 1 and 2 above except that a spur gear 32 is used for the output, rather than internal ring gear 10. Gear teeth 34 of the spur gear are thus in mesh with worm gear 22 of ring gear 8. Since the gears 4, 6 and 8, and their operation, are the same as that described above with respect to speed reducer 2 of FIGS. 1 and 2, such description need not be repeated here.

The speed reducer 30 is mounted on a support plate 36 as follows. The drive motor 14 is contained inside a housing 38 which is provided with a flange 40. The housing is mounted on one side of the support plate 36 by means of bolts 42 extending through holes in the flange. The support plate has a central opening 44, in which the high speed input worm 4 is located. The front surface 46 of the support plate is provided with a pair of raised islands 48 and 50, which are crescent-shaped circular segments. The opening 44 extends through island 48 as shown in FIGS. 3 and 4.

The support plate 36 has a cross-shaped opening 51, shaped to receive the ring gear 6 therein, with a sufficient, but small amount of clearance, around the ring gear 6, to allow the ring gear 6 to rotate in the opening 51. The opening 51 includes a central rectangular hole 52, and two, spaced-apart, rectangular grooves 53 and 55. The hole 52 communicates with the opening 44 and with the grooves 53 and 55. The islands 48 and 50 are provided with cut-out portions 54 and 56, further defining the rectangular grooves 53 and 55. The ring gear 8 has a circular inside diameter which is slightly larger than the circular outside diameter of the island 48, such that the ring gear 8 is mounted by slipping it around the island 48 (around which it rotates), when ring gear 8 and its interlocked ring gear 6 are mounted on the support plate 36. A cover plate 58 is attached, by means of screws 60, for example, to the island 50, to aid in preventing the interlocked gears 6 and 8 from slipping off of the support plate 36. The plate 58 has a curved portion or groove 62 which envelops, and is in sliding contact with, the outer rotating surfaces of end extensions 64 and 66 of the ring gear 6. End extensions 64 and 66 are seated in grooves 53 and 55 respectively. The spur gear 32 is mounted for rotation below the hole 44 and with its teeth 34 in mesh with those of ring gear 8. The spur gear 32 is rotatably mounted on axle 68 and is provided with a power output shaft 70.

Regarding the mounting of speed reducer 2 of FIGS. 1 and 2, gears 4, 6 and 8 thereof are mounted on support 36 in the same manner described above regarding speed reducer 30 of FIGS. 3 and 4. Ring gear 10 has an internal diameter large enough to accommodate island 50 therewithin. Shaft 12 can be provided with bearing supports (not shown) for supporting ring gear 10, if desired, or a bearing surface should be provided around the outside diameter of gear 10.

It is noted that the input and output shafts of the speed reducer of this invention are in line, thus providing a speed reducer which can be directly mounted on the end of a high speed motor or turbine, and which will provide an in-line output shaft. The speed reducer can be made in a great variety of sizes and shapes and the reduction can be high as many thousand to one while still providing a small unit, as compared to other speed reducers. The speed can be easily varied in a given reducer by using a multiple lead input worm, for example. The speed reducer is also unusually quiet, compared to other reducers. This is due to the elmination of extra gear stages and/or the geometry of the internal worm. The subject speed reducer can be easily fabricated, for example, by die-casting with little or no machining since there are no bearing shafts to be aligned.

It is to be understood that the internal worm of this invention can also be used in other gear systems, in addition to the speed reducer shown in the drawings, as will be understood by one skilled in the art. For example, a ring gear having an internal worm can be used with a longitudinal rack extending normal to the ring gear and through the opening therein. The internal worm can be formed in a complete ring gear, which can be either a one or two-stage type, and the ring gear can be circular, elliptical and even arcuate, i.e., forming only a part of an enclosed geometric curve which would be reciprocating, for example, as will be understood by one skilled in the art. Further, various gears can be in mesh with the internal worm including a ring gear smaller than the opening in the internal worm ring gear so that it is not necessary that it be "interlocking," but it can be freely located within the opening. Also, the ring gear 8 can be a two-stage ring gear with internal gear teeth also adapted to mesh with the internal worm. By having both the external and the internal gear teeth of the ring gear 8 mesh with the internal worm at the same time, a large number of teeth can be put in mesh for transmitting high torque. On the other hand, by providing for relative movement between the ring gear 6 and the ring gear 8, and by using two different sets of internal worms on ring gear 6, one for meshing with the *external* gear teeth on the ring gear 8 and a different one for meshing with the *internal* gear teeth on ring gear 8, changes in speed and direction can be made. For example, one internal worm can be centrally positioned within ring gear 6 for meshing with the external gear teeth on ring gear 8. A second, different, internal worm can be placed on the axially outermost regions of the ring gear 6 for meshing with the internal gear teeth on ring gear 8. The two sets of internal worms can drive the ring gear 8 at different speeds and/or in different directions. Further, more than one ring gear can be interconnected with an internal worm ring gear. Variations in the shape of the gear teeth, shown in the drawings, can be made as will be understood by one skilled in the art. For example, the internal worm shown in FIG. 1, can be curved in the direction of its axis, rather than being straight and parallel to its axis, so as to envelop a larger segment of gear 8, to provide a larger number of teeth in mesh between gears 6 and 8.

The invention has been described in detail with particular reference to preferred embodiment thereof, but it will be understood that variations and modifications can be effected within the spirit and scope of the invention as described hereinabove and as defined in the appended claims.

I claim:

1. Apparatus comprising a ring gear including an internal worm and a second ring spur gear having straight gear teeth parallel to the axis of the spur gear in meshing engagement with said internal worm.

2. The article according to claim 1 including means for supporting said ring gears substantially normal to each other.

3. Apparatus comprising a ring gear having an internal worm and a second ring gear having gear teeth in meshing engagement with said internal worm, said gear teeth on said second ring gear being only on the outside diameter surface thereof.

4. Apparatus comprising a first ring gear including an internal worm and a second gear having straight gear teeth perpendicular to the axis of the first gear and in meshing engagement with said internal worm.

5. Apparatus comprising a first ring gear having an internal worm and a second ring gear having gear teeth in meshing engagement with said internal worm, with less than half of the circumferential surface of said internal worm being in meshing engagement with said second gear.

6. A speed reducer comprising:
a first ring gear having an internal worm, a second ring gear in meshing engagement with said internal worm of said first ring gear, an input shaft in driving engagement with said first ring gear, said input shaft including an input worm and in which said first ring gear includes gear teeth on its outside diameter surface in meshing engagement with said input worm,
a third gear in meshing engagement with said second ring gear, and
a power output shaft connected to said third gear.

7. The apparatus according to claim 6 in which said third gear is an internal ring gear.

References Cited

UNITED STATES PATENTS

| 11,703 | 9/1854 | Sterling | 74—424.5 |
| 511,169 | 12/1893 | Snider | 74—413X |
| 1,491,490 | 4/1924 | Newton | 74—424.6 |
| 2,505,435 | 4/1950 | Schmidt | 74—425X |
| 3,449,971 | 6/1969 | Posh | 74—89.15 |

LEONARD H. GERIN, Primary Examiner

U.S. Cl. X.R.

74—413, 424.5